(No Model.)　　　　　　　　G. W. RIFE.　　　　　　3 Sheets—Sheet 1.
GANG PLOW.

No. 440,900.　　　　　　　　　　　　Patented Nov. 18, 1890.

Witnesses
Isaac C. Doan
James M. Morris

Inventor
George W. Rife
by W. D. Denney
atty

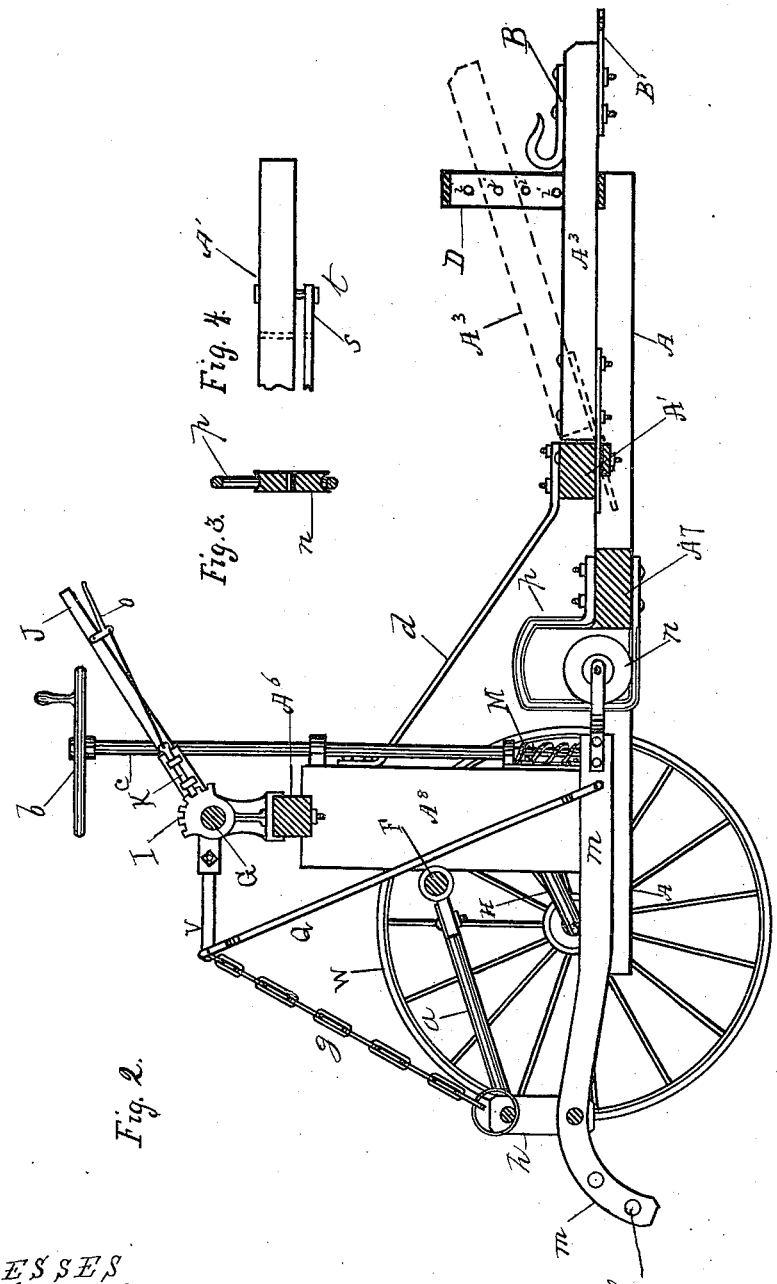

(No Model.)  3 Sheets—Sheet 3.

G. W. RIFE.
GANG PLOW.

No. 440,900.  Patented Nov. 18, 1890.

Witnesses.
Isaac E. Doan
James M. Morris

Inventor
George W. Rife
by W. J. Dennis
Atty

UNITED STATES PATENT OFFICE.

GEORGE W. RIFE, OF RICHMOND, INDIANA.

GANG-PLOW.

SPECIFICATION forming part of Letters Patent No. 440,900, dated November 18, 1890.

Application filed June 9, 1890. Serial No. 354,857. (No model.)

*To all whom it may concern:*

Be it known that I, GEORGE W. RIFE, a citizen of the United States, residing at Richmond, in the county of Wayne and State of Indiana, have invented certain new and useful Improvements in Gang-Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of plows known as "gang-plows," in which two or more plows are connected and operated at once.

The object of my invention is to produce a series of plows so arranged and attached as that in their combined form they are capable of effective work, simple in construction, easily controlled, and adapted to be drawn or operated by an ordinary traction-engine or any other suitable propelling-power.

My invention consists of a hitching device, by which the gang-frame can be readily connected to the motive power at different altitudes without disarranging the working of the plows, and by which a center draft is maintained, whether one or all of the plows are in the ground at the same time.

It further consists in the devices, as herein described, by which both ends of the beam of the plow can be lifted simultaneously, raising the plows out of the ground separately or collectively, as may be desired.

Figure 1:
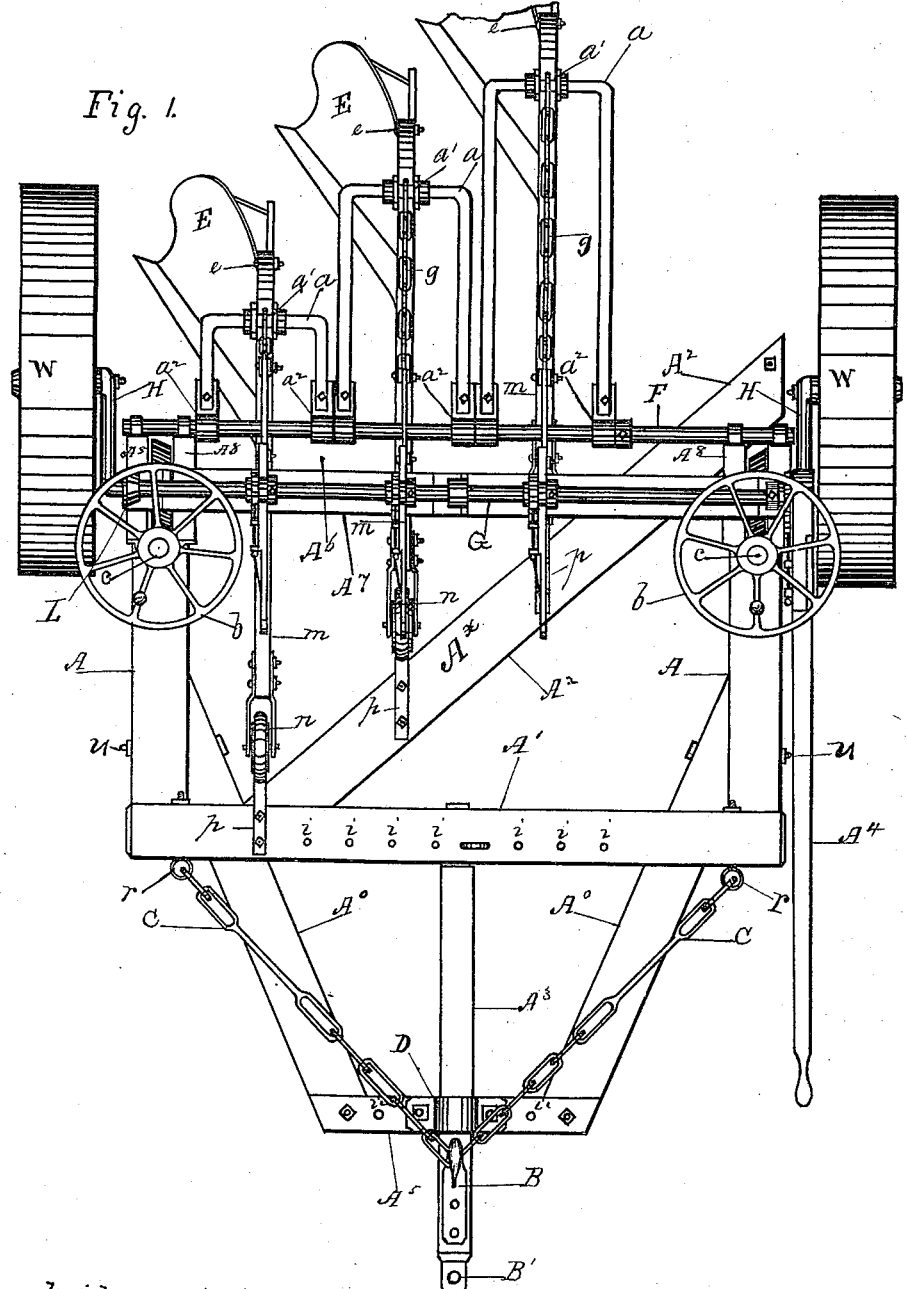
Figure 5:
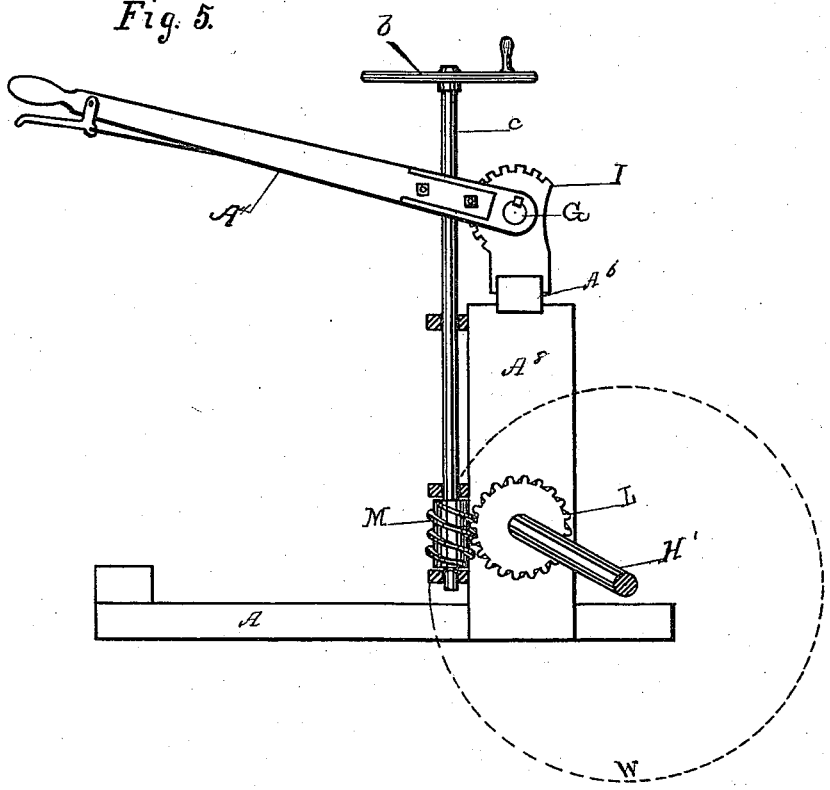
Figure 6:
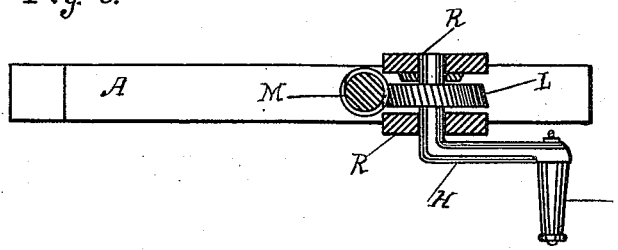

In the drawings, Figure 1, Sheet 1, is a top plan view of my improvement, showing the hitching device by which the machine is attached to the motive power and the manner in which the plows are arranged and attached. Fig. 2, Sheet 2, is a side elevation of my improvement, showing the hitching device, the plow-beam and its connections, the means for raising and lowering the same, the method of operating the crank-axle, and the framing by which these mechanisms are supported. Fig. 3 is a front elevation of the yoke which is attached to the cross-framing, within which the wheel attached to the front end of the plow-beam travels up and down, the wheel being shown in section. Fig. 4 is a front elevation of a section of the cross-framing of the hitching device, showing an opening for the side motion of the draft-tongue. Fig. 5, Sheet 3, is a side elevation, partly in perspective, of the device for operating the crank-axle with the framing which supports the same; also, the lever-pawl and ratchet used in raising the plow-beams. Fig. 6, Sheet 3, is a horizontal section of the crank-axle and its bearings; also the shaft screw-gear and the frame supporting the same.

In Fig. 1, Sheet 1, A A A represent the main outside framing of the machine.

A' is the front cross-piece of the main frame and forms the base of the draft for the hitching device, and is so constructed as that the draft-tongue $A^3$ is connected with it at right angles in such manner as to be adjustable laterally and secured by pins through the holes $i\ i\ i\ i$. This connection also allows the draft-tongue to be elevated or depressed at its front end to accommodate higher or lower hitching to the motive power.

The front end of the draft-tongue $A^3$ is provided with a hook B, the base of which is a plate bolted fast to the front end of the draft-tongue. A coupling-bar B' is secured to the under side of the front end of the tongue, which projects forward beyond the end of the tongue, and is provided with an opening to insert a coupling-pin.

A chain C C, formed of open links, is secured by screw-bolts to each end of the cross-piece A', and of length sufficient to reach to the hook B, through the curve of which it is held in any desired point, as may be determined by placing the links so as to be held rigidly in the curve of the hook B. An elevated bracket D, secured to the short front framing $A^5$, is arranged to receive and hold the tongue $A^3$, and on which it is permitted to be raised or lowered by means of pins arranged to pass through the holes $i\ i\ i$, and along with which it is permitted a lateral motion by means of holes $i'\ i'\ i'$ in the front framing $A^5$ and screw-bolts working in said holes. The tension of the draft-chain C C is regulated by the screw-bolts $r\ r$ at each end of the cross-piece A'. Angular side pieces $A^\circ\ A^\circ$ are beveled onto the side framing A A and secured thereto with bolts at $u\ u$, and forming the foundation and support of the hitching device.

$A^6$ $A^7$ are square pieces of timber reaching across the width of the frame parallel with the shafts F and G, and secured to the vertical standards $A^8$ $A^8$, Fig. 5, Sheet 3, and Fig. 2, Sheet 2, and form supports for the shafts F and G and their attachments.

Yokes $a$ $a$ $a$, made of metallic rods corresponding in form to three sides of a parallelogram, have their ends terminating in clips which embrace the shaft F and on which the clips are permitted to partially revolve. The yoke $a$ at its closed end is provided with a bracket $h$, Fig. 2, Sheet 2, which connects it with the plow-beam. The bracket is held in place upon the yoke by collars $a'$ $a'$, fitted closely to the brackets, and serve to keep the plow-beam in the line of draft. The closed ends of the yoke, with the plows to which they are connected, have a free vertical motion. Attached to the closed end of the yoke $a$ is a chain $g$, which extends upward and is secured to a horizontal arm $v$, which is a continuation of the hand-lever J, to which is connected a segment-ratchet I, these having a common axle upon the shaft G. The hand-lever J is provided with a spring-pawl K, which is operated by a hand-lever $o$. The operation of this hand-lever is as follows: When the outer end is pressed downward, it turns the ratchet-segment, elevates the arm $v$, and by means of the chain $g$, connected with the yoke $a$ and the bracket $h$, raises the standard and mold-board out of the ground. Each one of the plows connected with the gang is thus raised independently of each other. An angular brace-rod Q is attached to the outer end of the rod V, and is connected with the front end of the plow-beam $m$. By this means pressing upon the outer end of the hand-lever J exerts a downward pressure through the arm $v$ and the brace Q upon the front end of the plow-beam $m$, increasing the depths of the furrow when it is desired.

Each beam $m$ is furnished at its forward end with a wheel $n$, having a grooved circumference which fits into and traverses the vertical portion of the loop $p$ upon its inside, thus allowing a free up-and-down movement of the front end of the beam simultaneously with the rear end of the same. The loop $p$ is attached by screw-bolts to the angular cross-framing $A^x$. An angular brace $d$, Sheet 2, Fig. 2, secures the upright standard $A^8$ to the front cross-framing $A'$. The vertical standard $A^8$ supports the cross-framing $A^6$, which in its turn supports the shaft G.

The hand-wheel $b$, Sheet 2, Fig. 2, is attached to a vertical shaft $c$, which rests upon the side framing A, and is provided at the lower portion with a worm-feed, which works into the cogs of the gear-wheel L. To this gear-wheel L a crank-axle H is secured, and by turning the shaft $c$, thereby operating the gear-wheel L, the axle is turned forward or backward, by which the frame is raised or lowered and the wheel changed in its relative position backward or forward. The shaft of the crank-axle has its bearings in the framing A, as may be seen in Fig. 6, Sheet 3.

In Fig. 3, Sheet 2, $p$ represents the vertical portion of the loop $p$, and $n$ is the grooved wheel attached to the front end of the plow-beam.

$A'$, Fig. 4, is a section of the framing.

$s$ represents a plate loosely attached underneath the framing, held by a bolt $t$, said opening being for the reception of the plate underneath the draft-tongue $A^3$, and in which is allowed both a lateral motion and the raising and lowering of its front end.

$A^4$, Fig. 7, Sheet 1, and Fig. 5, Sheet 3, represents a lever with pawl and spring, having a ratchet-segment I, and attached to the outer end of shaft G. This lever is rigidly attached to the shaft, and when it is turned it turns all the arms connected with the plows which are attached or connected to the shaft G, so that by its operations all the plows are raised out of the ground simultaneously.

W W are broad-faced wheels upon which the whole frame-work is carried, and when one of them traverses the furrow the crank-axle of the opposite wheel is turned back sufficiently to lower the axle to the same plane in which the other works, so that the frame is carried level, and the plows are all on the same plane.

The plows E E E are made with a single standard, which is connected to the rear end of the plow-beam $m$ at the hole $l$, Fig. 2, Sheet 2, by a break-pin $e$, said connection being by means of a wooden pin passing through both beam and standard. An angular cross-piece of timber $A^x$ is placed transversely across the frame and made a part of the same, to which the loops $p$ $p$ $p$ are firmly secured by screw-bolts. As the draft of the plows is borne in a large degree by the wheels $n$ $n$ $n$ and loops $p$ $p$ $p$, it will be seen that the piece $A^x$ serves as the resistance-bar of the structure, and is placed at such an angle as that it gives the proper distance longitudinally between the plows with the same length of beam for each. The yokes $a$ $a$ $a$ are, however, of different length to accommodate the difference in the distance of the plow-connections from the shaft F, to which they are connected.

Having thus fully described my said invention, what I claim as new, and desire to secure by Letters Patent, is—

1. In a gang-plow, the hitching device composed of the angled side framing $A^0$ $A^0$, the front bar $A^5$, the draft-tongue $A^3$, provided with hook-plate B, and coupling-bar $B'$, combined with the chain $c$, framing $A'$, and screw-bolts $r$ $r$, constructed and operating in the manner and for the purpose substantially as described.

2. In a gang-plow, the main frame and the loops $p$, in combination with the plow-beams, wheels at the front end of said plow-beams, traveling in said loops, shaft G, having arms V, connected with said plow-beams, and means for operating said shaft.

3. In a gang-plow, the main frame and the plow-beams having vertical movement at their front ends, in combination with shafts F and G, brace-rods Q, yokes a, and the levers and lifting-chains, all arranged and operating substantially as shown and described.

4. In a gang-plow, the combination, with the frame and the loops p p, of the plow-beams having wheels at their forward ends, said wheels traveling in said loops, as described, the yokes a, brace-rods Q, shafts T and G, chains g, arms V, and lever T, all substantially as shown and described.

In testimony whereof I affix my signature in presence of two witnesses.

GEO. W. RIFE.

Witnesses:
W. T. DENNIS,
I. C. DOAN.